(12) United States Patent
Richardson et al.

(10) Patent No.: US 6,829,223 B1
(45) Date of Patent: Dec. 7, 2004

(54) COMPUTER NETWORK PHYSICAL-LAYER ANALYSIS METHOD AND SYSTEM

(75) Inventors: William M. Richardson, Bolton, MA (US); Neil Judell, Andover, MA (US)

(73) Assignee: Vigilant Networks LLC, Hampton, NH (US)

( * ) Notice: Subject to any disclaimer, the term of this patent is extended or adjusted under 35 U.S.C. 154(b) by 0 days.

(21) Appl. No.: 09/474,390

(22) Filed: Dec. 29, 1999

Related U.S. Application Data

(60) Provisional application No. 60/114,337, filed on Dec. 31, 1998.

(51) Int. Cl.[7] ............................................... G01R 31/08
(52) U.S. Cl. ......................... 370/241; 370/241; 324/628
(58) Field of Search ................................ 324/527, 508, 324/509, 512, 522, 523, 525, 532, 533, 601, 642, 659, 677, 76.19, 628, 710; 370/241–251, 201, 209–210, 389, 902, 908; 702/57–80, 109

(56) References Cited

U.S. PATENT DOCUMENTS

| | | | |
|---|---|---|---|
| 4,580,872 A | 4/1986 | Bhatt et al. ............... | 350/96.16 |
| 4,890,278 A | 12/1989 | Felker et al. .................. | 370/17 |
| 5,062,703 A | 11/1991 | Wong et al. ................ | 356/73.1 |

(List continued on next page.)

FOREIGN PATENT DOCUMENTS

| | | |
|---|---|---|
| EP | 0 768 537 A1 * | 7/1986 |
| EP | 0 474 379 A1 | 8/1991 |
| EP | 0 675 607 A2 | 11/1994 |
| EP | 0 691 546 A2 | 5/1995 |
| EP | 0 721 100 A2 | 7/1996 |
| EP | 0 768 537 A1 * | 7/1996 |
| EP | 0 768 537 A1 | 4/1997 |
| WO | WO 97/27685 | 7/1997 |
| WO | WO 98/01976 | 1/1998 |

OTHER PUBLICATIONS

Ed Tittel, "Troubleshooting keeps LANs up and running", *Networking Management*, 9(1) :54 (1991).

Jander, Mary, "LAN Testers Get a Grip on Internetworks: Net managers on the go can get some heavy help from the latest in lightweight testers", *Data Communications*, 22(12) :95 (1993).

Metcalfe, Robert M., "Ethernet chip bugs? I'm sorry to say it's true", *InfoWorld*, 15(46) :62 (1993).

*Primary Examiner*—Douglas Olms
*Assistant Examiner*—Robert W. Wilson
(74) *Attorney, Agent, or Firm*—Rader, Fishman & Grauer PLLC

(57) ABSTRACT

A method and system for computer network physical layer analysis is describe using signal analysis techniques and beginning with time-domain responses to yield highly quantitative analysis of the computer network's physical layer. Specifically, multiple transmissions are accumulated into a composite response of the computer network link. This composite response is then used as the basis for analysis of the computer network link. Further, an automated process is described for location of an arbitrary termination of a link.

28 Claims, 9 Drawing Sheets

U.S. PATENT DOCUMENTS

| | | | | |
|---|---|---|---|---|
| 5,063,353 A | * | 11/1991 | Gubisch | 324/710 |
| 5,185,735 A | | 2/1993 | Ernst | 370/13 |
| 5,198,805 A | | 3/1993 | Whiteside et al. | 340/825.06 |
| 5,231,593 A | | 7/1993 | Notess | 364/550 |
| 5,243,543 A | | 9/1993 | Notess | 364/550 |
| 5,245,291 A | | 9/1993 | Fujimura | 324/617 |
| 5,289,390 A | | 2/1994 | Unverrich | 364/562 |
| 5,293,635 A | | 3/1994 | Faulk, Jr. et al. | 395/800 |
| 5,309,428 A | | 5/1994 | Copley et al. | 370/17 |
| 5,329,519 A | | 7/1994 | l'Anson | 370/13 |
| 5,365,509 A | | 11/1994 | Walsh | 370/13 |
| 5,377,196 A | | 12/1994 | Godlew et al. | 371/20.1 |
| 5,381,348 A | | 1/1995 | Ernst et al. | 364/514 |
| 5,383,178 A | | 1/1995 | Unverrich | 370/17 |
| 5,430,665 A | | 7/1995 | Jin et al. | 364/562 |
| 5,498,965 A | | 3/1996 | Mellitz | 324/532 |
| 5,532,603 A | * | 7/1996 | Bottman | 324/628 |
| 5,539,659 A | | 7/1996 | McKee et al. | 364/514 B |
| 5,586,054 A | | 12/1996 | Jensen et al. | 364/514 B |
| 5,664,105 A | | 9/1997 | Keisling et al. | 395/200.54 |
| 5,677,633 A | | 10/1997 | Moser et al. | 324/539 |
| 5,703,883 A | | 12/1997 | Chen | 370/501 |

* cited by examiner

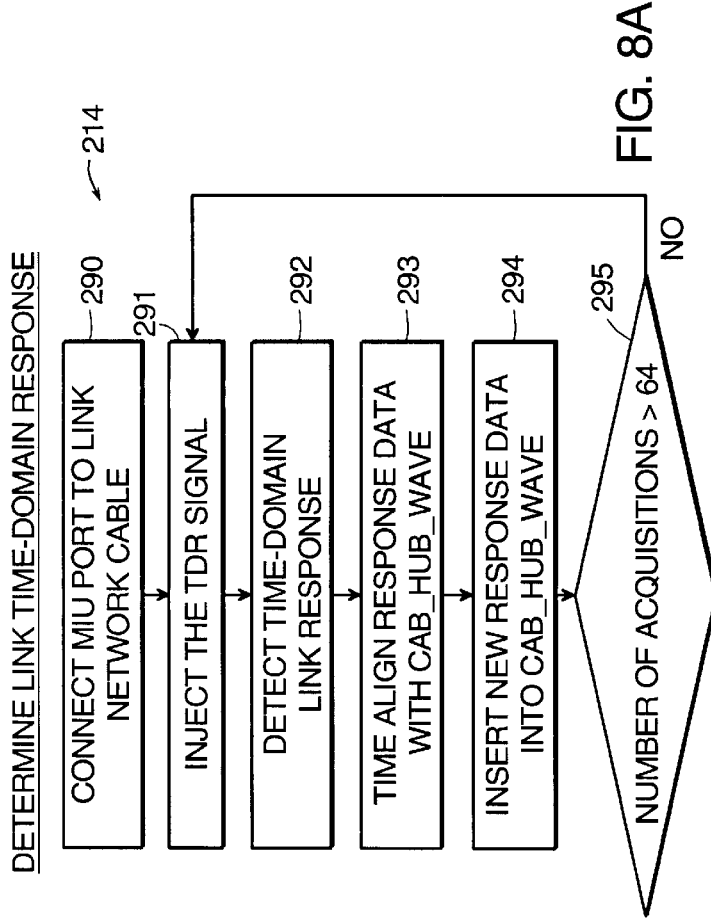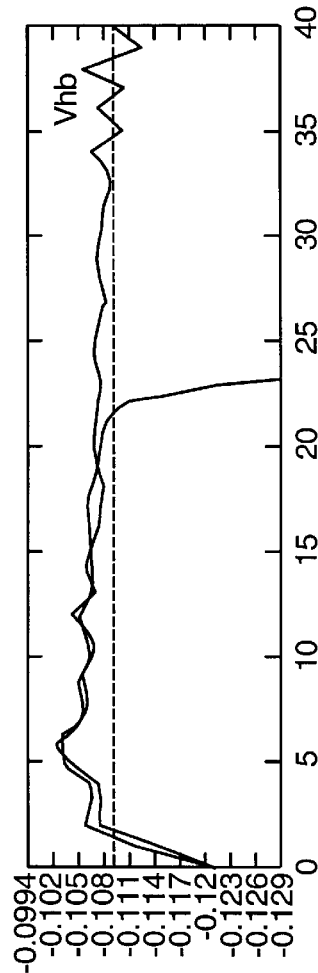
FIG. 8A
FIG. 8B

COMPUTER NETWORK PHYSICAL-LAYER ANALYSIS METHOD AND SYSTEM

RELATED APPLICATION

This application claims the benefit of U.S. Provisional Application No. 60/114,337, filed Dec. 31, 1998, entitled Computer Network Physical-Layer Analysis Method and System, by Richardson, et al., the contents of which are incorporated herein by this reference in their entirety.

BACKGROUND OF THE INVENTION

The integrity of a computer network's physical layer is critical to its proper operation. While much attention is directed to the operation of the computer-nodes and the network communications devices, e.g., hubs and switches, the relevance assumes proper behavior at the physical layer. For example, in ubiquitous 10Base2, 5, T, and 100BaseT networks, a number of physical layer problems lead to improper operation. Damage to the cabling creates impedance discontinuities in the conductors, which cause signal reflections. This can impair the proper signal transmission, decoding by the nodes or network communication devices, or collision detection, for example. Further, the length of the links can undermine the shared usage of the transmission media. Some protocol specifications, such as the inter-frame gap, are defined based upon the time needed for a given communication event to propagate throughout the entire communication network.

Time domain reflectometry (TDR) techniques have been used to analyze and validate computer networks at the physical layer. The basic process involves generating a predetermined, TDR, signal, such as an impulse or step function, on the conductors of the computer network. At the point of injection, a signal analysis device, such as a digital sampling oscilloscope, is used to monitor the computer network conductors for reflections of the signal. These reflections are induced by impedance discontinuities along the computer network transmission media. The size of the reflected signals is indicative of the size of the impedance discontinuity, and the delay between the generation of the TDR signal and the detection of the reflection is indicative of the distance to the discontinuity based upon the round-trip signal travel time.

In the past for data networks, time domain reflectometry techniques have been essentially qualitative in nature. The voltage magnitude of the reflected signals was used as a gross measure of the size of the impedance discontinuity, and the distance to the discontinuity could be measured. Other parameters such as attenuation could be estimated by electrical signal measurements only when the physical length of the link was known.

SUMMARY OF THE INVENTION

The present invention is directed to a method and system for computer network physical layer analysis. It uses signal analysis techniques and begins with time-domain responses to yield highly quantitative analysis of the computer network's physical layer. Moreover, it enables the isolation of the response of a desired section of the computer network, including the removal of the contribution of portions of the network that are not under analysis and/or computer network communication devices such as hubs. This facilitates targeting of the node-side of the computer network, which is most susceptible to physical damage and unauthorized modification, but is also relevant to cable and installed-network validation.

In general, according to one aspect, the invention features a method for computer network physical layer analysis. The method includes detecting transmissions on a computer network link including instantaneous voltage levels on a computer network media of the link. Multiple transmissions are accumulated into a composite response of the computer network link. This composite response is then used as the basis for analysis of the computer network link.

In the preferred embodiment, the step of accumulating multiple transmissions comprises accumulating at least ten transmissions into the composite response prior to the step of analyzing the computer network link using the composite response. Preferably, the transmissions are a predetermined signal that is generated on the computer network link.

To facilitate further analysis, a response of a network communications device maintaining the network communications link is preferably detected. Here again, a composite response is preferably formulated.

Analyses such as the calculation of the resistance and an impedance as a function of frequency of the computer network media from the composite response are preferably performed, including corrections for accumulated resistivity of the network transmission media. Typically, in the context of a fully configured link, a response of a network communications device maintaining the network communications link is preferably detected.

Crosstalk can also be measured by stimulating one wiring pair and measuring a response to the stimulus on another wiring pair of the network communications link. Here again composite responses are preferably generated to increase precision of the measurement. In one embodiment, the wiring pairs are stimulated with a Walsh Hadamard function.

In general, according to another aspect, the invention also features a system for computer network physical layer analysis. The system includes a digitizer for detecting transmissions on a computer network link including instantaneous voltage levels on a computer network media of the link and a controller for accumulating multiple detected transmissions into a composite response of the computer network link and analyzing the computer network link in response to the composite response.

In general, according to another aspect, the invention also features a method for computer network physical layer analysis. This method includes generating a predetermined signal on a computer network link. A response of the computer network link to the predetermined signal is then detected and analyzed for indicia of a termination using at least two different criteria preferably by a controller. The results of the analysis are then compared to characterize the termination. This is useful where the type of termination is not known, a priori, but the analysis is automated.

The above and other features of the invention including various novel details of construction and combinations of parts, and other advantages, will now be more particularly described with reference to the accompanying drawings and pointed out in the claims. It will be understood that the particular method and device embodying the invention are shown by way of illustration and not as a limitation of the invention. The principles and features of this invention may be employed in various and numerous embodiments without departing from the scope of the invention.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

FIG. 8A is a process diagram illustrating the signal processing steps associated the detection of the links' time domain response;

FIG. 8B is a plot of an exemplary composite response of the network link, cab_hub_wave, compared with the composite hub response, hub_cal_wave.

DETAILED DESCRIPTION OF THE INVENTION

Figure 1:
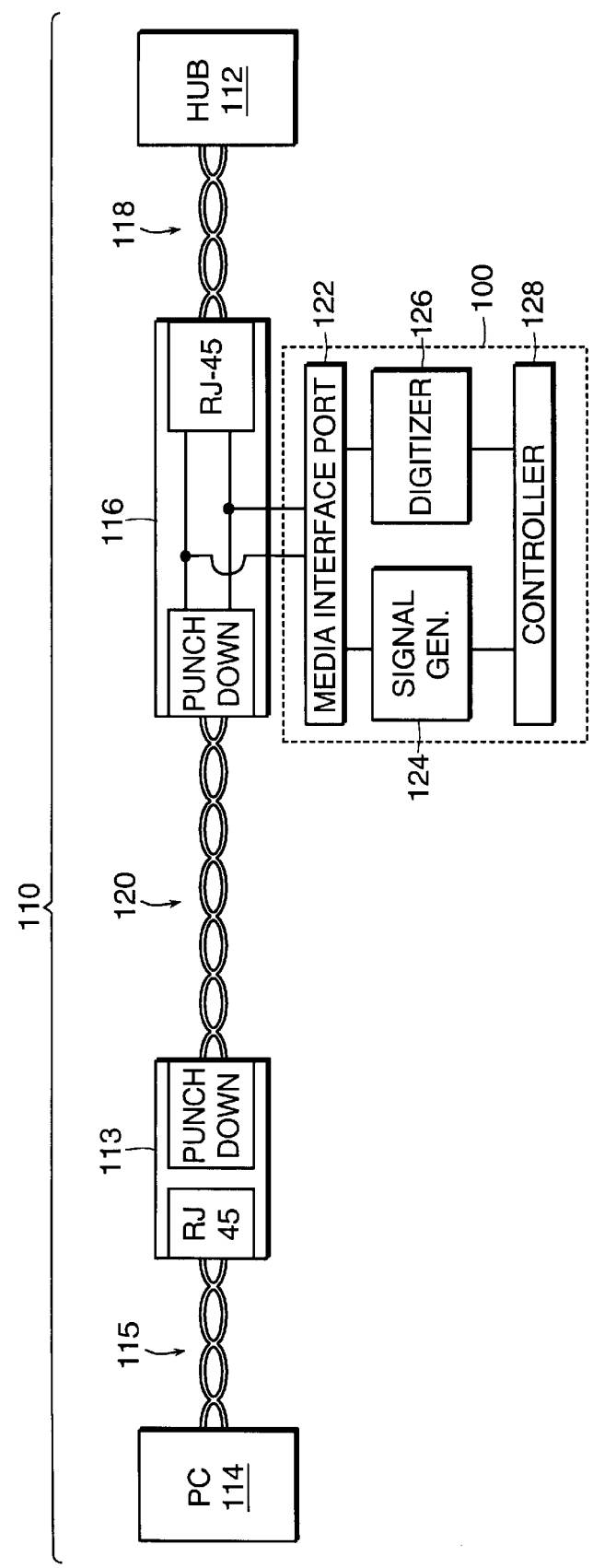
FIG. 1 is a block diagram showing the connection of a physical layer analysis system of the resent invention to a computer network at a network a patch panel.

FIG. 1 illustrates the connection of the physical layer analysis system 100 to a computer network link 110. Specifically, the link 110 comprises a computer network communications device, which maintains the link 110. In the illustrated embodiment, this device is a hub 112. Alternatively, in other implementations, it could be an independent local area network, having individual collision domain, that is maintained by a switch, for example.

As is typical in most computer network configurations, the computer network communications device 112 is connected to a node 114 via a patch panel 116. Commonly, a patch cable 118 connects the hub 112 to the panel 116, one cable for each link maintained by the hub. The computer nodes 114 are connected to wall boxes 113 via patch cables 115. Horizontal cables 120 originate at the wall boxes 113 and terminate at the patch panel 116. The patch panel supports the electrical connection between the separate patch cables 118 and the conductors of the horizontal cables 120 for each link.

The inventive analysis system 100 comprises a media interface port 122, which connects a signal, i.e., arbitrary function, generator 124 and digitizer 126 to the link 110 at the patch panel 116 where the access is provided to the link cabling or signal transmission media of the link. The signal generator 124 is used to generate a TDR signal, which is a step function in the preferred embodiment. The digitizer 126 is used to monitor the voltage on the link cabling or media as a function of time after generation of the step transition to measure the response of the link 110 to the TDR signal. In the preferred embodiment, the digitizer is a storage oscilloscope-type system having a long memory, which is filled on each acquisition, samples being separated in time by some fixed delay such as 1 nanosecond (ns), in one implementation. The controller 128 synchronizes the operation of the signal generator 124 and digitizer 126 and most importantly, analyzes the data captured by the digitizer to perform the physical layer analysis of the link 110.

The use of the digitizer 126 distinguishes the inventive system from a large majority of other, conventional computer network analysis systems. Many such analysis systems interface to the physical layer of the network in a manner similar to the network interface cards of computers or media interface (phys) hardware of network communications devices. Specifically, a decoder front-end is used to compare the instantaneous voltage on the media to a threshold and thereby determine whether the voltage is a logic high, logic low or transitioning from low-to-high or high-to-low. In contrast, the system of the present invention measures the instantaneous voltage of the media to a defined level of accuracy, specifically 8-bit accuracy in the present-described embodiment. This measurements is performed periodically, i.e., once a nanosecond. Thus, the system assesses the signal response of the media to a much higher level of accuracy than minimally required to decode the transmissions on the media to thereby enable analysis at the physical layer.

Figure 2:
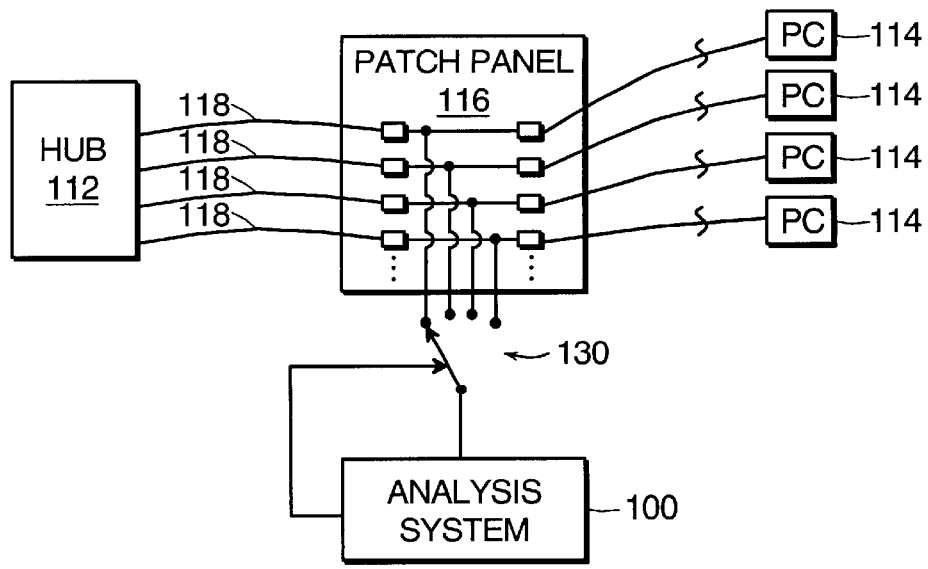
FIG. 2 is a schematic diagram showing the connection of the analysis system in a star topology network.

As shown in FIG. 2, in one implementation, the analysis system 100 accesses multiple, or all, the links serviced by a given network communication device 112 via the patch panel 116. This multi-link monitoring capability is provided by a switching unit 130 connected between the system 100 and the patch panel 116, in the illustrated implementation. The switching unit 130 is preferably controlled by the analysis system 100 to enable automated scanning of the multiple links with fewer, or only single or dual, digitizers 126 and signal/function generators 124. Further, the switching unit 130 further enables access to each cable/cable-pair of the links 118. In the context of some protocols, only a single twisted pair is used for signal transmission, but typically higher data-speed protocols, such as 100BaseT, utilize multiple, such a four, twisted pairs in the common CAT5/RJ45 cabling scheme. Note, however, that a signal generator preferably should be provided per each twisted pair for very high bandwidth analysis.

The implementation discussed with reference to FIGS. 1 and 2 is potentially more appropriate for analyzing and verifying fully installed and even operational or operating networks. Different implementations are more appropriate at earlier stages in computer network deployment or where a specialized patch panel providing physical layer access to the links is not deployed in the network.

Figure 3:
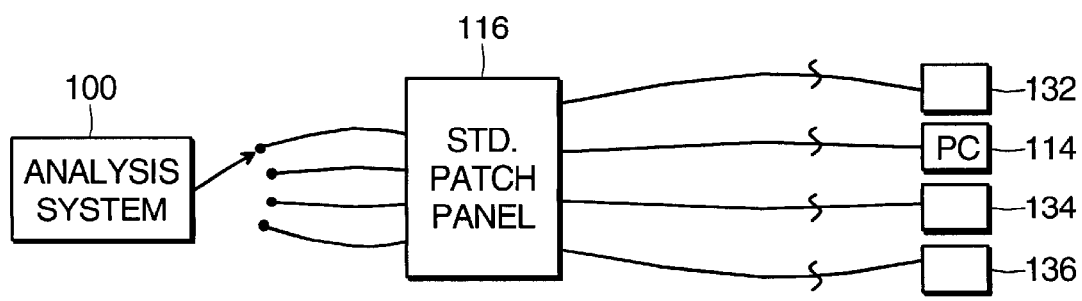
FIG. 3 is a schematic diagram showing the connection of the analysis system to an inactive installed network for validation, for example.

FIG. 3 shows another implementation of the system that possibly more appropriate for use by computer-network installers. Here, the analysis system 100 is placed at one end of the link cabling. In the illustrated example, the system 100 replaces the network communications device. A standard patch panel 116 is all that is required to provide physical layer access. Further, the computer nodes 114 are connected onto the network as shown, to provide a typically matched termination to the link. Alternatively, special, passive terminators 132 are installed on some of the links or the links are open circuited (134) or short circuited (136) as also illustrated. As described below, the analysis system 100, in its preferred embodiment, has the intelligence necessary to identify the termination-type present on a per-link basis, in an initial step of the analysis process.

In this installer-mode implementation, the analysis system 100 is either manually connected to test each link or an automated switching matrix is used to successively provide access to each link to enable the testing.

Figure 4:
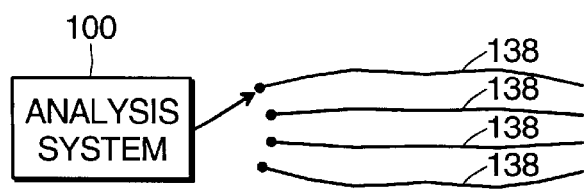
FIG. 4 is a schematic diagram showing the connection of the analysis system for cable validation and analysis.

FIG. 4 shows still another implementation appropriate for computer network cabling manufacturers, for example. Here, the analysis system 100 is used to test cabling prior to sale to the end-user. The analysis system 100 is used to test computer network cables 138, which are alternatively patch cables or larger multi-cable bundles used for example in horizontal cables, cabling to individual nodes, or inter-device links. Note that in each of the embodiments described herein, such as the FIG. 2 and FIG. 4 embodiments a network may have various terminations of the type described in connection with FIG. 3 and such terminations can be located and characterized, in accordance with the inventive system.

Figure 5:
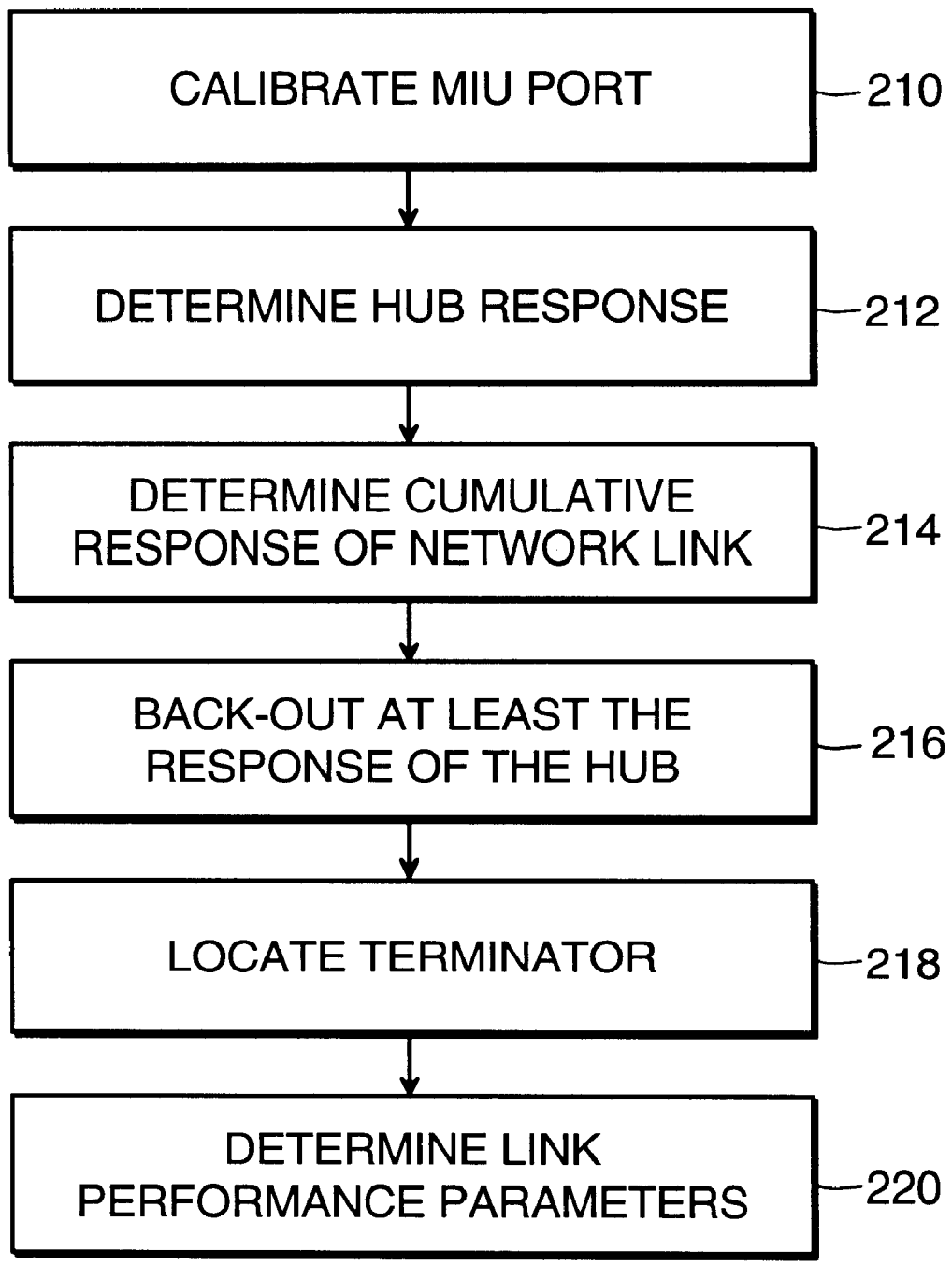
FIG. 5 is a process diagram showing the general steps associated with performing physical layer analysis on network cabling.

FIG. 5 is an overview illustrating the operation of the inventive analysis system 100. Specifically, in step 210, the system 100 calibrates the media interface unit port 122. This involves the generation of the TDR signal by generator 124 under known conditions and then using the digitizer 126 to detect the response via the port 122. This allows the system controller 128 to assess the signal generation characteristics, e.g., strength and d.c. biasing, of the TDR signal that is generated by the signal generator 124 and the sampling sensitivity of the digitizer 126 and any d.c. offset.

Next, in step 212, the system 110 detects the network communications device, or hub, response to the TDR signal in the time-domain. In the configuration shown in FIGS. 1 and 3, the system 100 is used to detect the physical layer parameters of the link 110 while the network communications device, such as hub 112, is connected to the link. In this step, the TDR signal is injected onto the link cabling with the node or user-side of the link disconnected and/or replaced with an element with a known signal response, such as resistors matched to the characteristic impedance of the link cabling.

The implementation of the step of determining the hub-side response to the TDR signal is preferred for two reasons. First, the system analyzes the port or channel of the hub that supports the link 110. This yields information concerning the status of the communications device. Further, the hub-side response is also stored for later use to remove the hub and cable contribution to provide an accurate representation of the user-side portion of the link to the operator. The user-side or node-side portion of the link 110 and specifically the associated cabling is typically the most susceptible to damage. The recorded hub-side response is used by the controller 128 to isolate the node-side response of the link.

It should be noted, however, that step 212 is not strictly necessary for all anticipated implementations, but typically necessary only where the system 100 is connected into an active channel. In the one-ended implementations of FIGS. 3 and 4, step 212 is avoided or unnecessary since there is little need to remove the contribution of one side of the link to enable detailed analysis of the other side, relative to the point of TDR signal insertion.

Next, in step 214, the cumulative time-domain response of the network link 110 is determined. In the implementations of FIG. 1 and 2, this response includes both the hub-side and the node-side of the network links.

Then, in step 216, the controller 128 uses signal processing to remove the response of the hub-side of the network. This enables the analysis of the node-side of the network with the hub being attached. However, as noted above, node side isolation is not typically relevant for the implementations discussed with reference to FIGS. 3 and 4.

In the node-side analysis, one of the most important processing steps is the location of the terminator in step 218. Typically, this involves the detection of the termination in the network interface card of the computer node 114. Alternatively, in bus-type configurations, it typically concerns the detection of the matched termination at the end of the bus-configured link. Further, in any of the configurations of FIGS. 2, 3, and 4, special terminators or open/short link or NIC (network interface card) terminations may be present.

Finally, in step 220, the controller 128 determines link-performance parameters by analysis of the response of the isolated node-side of the network.

Figure 6A:
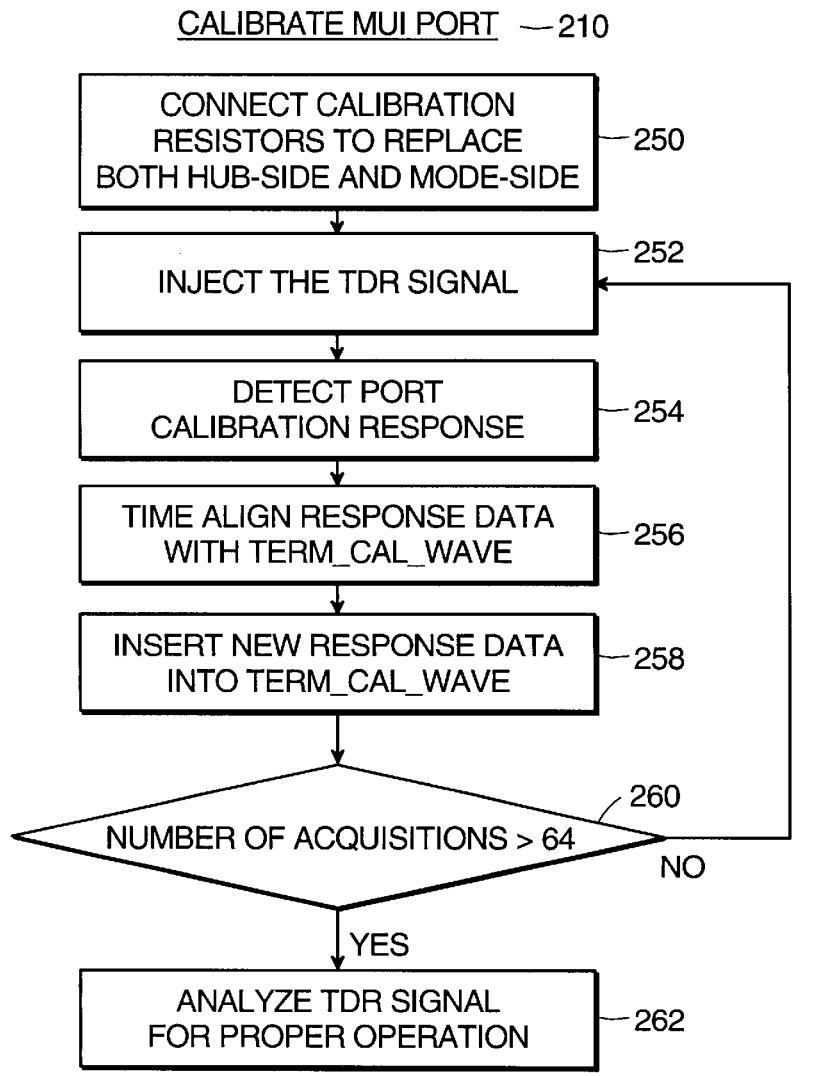
FIG. 6A is a process diagram illustrating the calibration of the media interface unit port in the inventive system according to the present invention.

FIG. 6A is a process diagram illustrating the specific steps performed in the MIU port calibration of step 210 in FIG. 5. Specifically, both the hub-side and the node-side of the link 110 are replaced with known calibration resistors in step 250. Alternatively, in the one-ended implementations, only the single connection to the cable-under-test is replaced with the calibration resistor.

The resistors are typically selected so that they correspond to the nominal characteristic impedance of the cabling. For example, in unshielded twisted pair (UTP) cabling, 100 Ohm resistors are used; in a co-axial cable network, a 50 Ohm resistors are used; and in a shielded twisted pair (STP) network, 150 Ohm resistors are used.

Next, the TDR signal from the signal generator 124 is injected into the calibration resistors in step 252. The digitizer 126 then detects and stores the response received via the media interface port 122 in step 254.

Although data from a single TDR signal injection and detected response are used in some implementation, in the preferred embodiment, a composite response is generated by combining the results of multiple sampling events into a data array, term_cal_wave. Specifically, the response of the link to multiple injections of the same predetermined signal are recorded.

The combination of multiple sampling events into a single array for analysis has a number of benefits concerning accuracy and small feature detection. First, signal-to-noise ratio is increased dramatically. The accuracy to which resistance is calculated increases dramatically. Secondly, temporal accuracy is also increased. The multiple acquisitions are time-aligned with respect to each other in term_cal_wave array to greater than the time delay between successive samples in any given acquisition. In the current embodiment, the digitizer samples at 1 nanosecond (ns) intervals, accumulating 1 Gigasamples in each acquisition. The acquisitions are aligned to less than 100 picoseconds (ps). This allows small feature location to accuracies of a few centimeters. Further, it facilitates the avoidance of blindspots and thereby enables the analysis of regions of the network cabling near the point of TDR signal injection.

In more detail, in step 256 the acquisition is time-aligned with respect to the data array term_cal_wave and thus data from any previous acquisitions. In the current embodiment, this alignment is achieved using a combination of hardware and software-based techniques. Gross alignment is achieved by the digitizer's triggering that started the acquisition. Sub-sampling interval accuracy is achieved by software pattern matching techniques that compare features in the data of the current acquisitions to previous acquisitions or the cumulative response of the data array. Then, in step 258, the sample data from the new acquisition is inserted into term_cal_wave array.

The number of acquisitions that are used to generate the composite response determines the gain in accuracy and SNR. In the preferred embodiment, greater than 5 acquisitions are used, but usually more than 10 are preferable. In fact, in two current embodiments, 64 and 256 separate acquisitions are used.

When the selected number of acquisitions have been performed, the process proceeds in step 260.

In step 260, the controller 128 analyzes the detected TDR signal for proper operation of the signal generator 124. Specifically, the rise/fall time of the signal is detected to determine whether or not it is within defined parameters. Further, the magnitude of the signal as detected by the digitizer is used to assess the strength of the signal generated by the signal generator and the sensitivity of the digitizer.

Figure 6B:
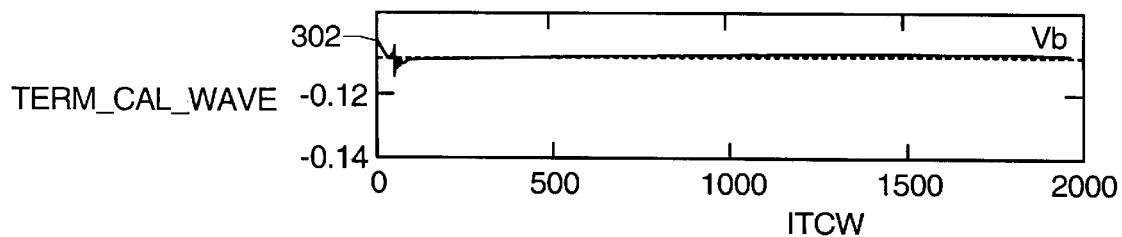
FIG. 6B is a plot of a cable's voltage response as a function of time for MIU port calibration.

FIG. 6B illustrates an exemplary composite response or plot of the term_cal_wave data array. Important features are the step voltage of the edge 302. In the current embodiment, a negative-going TDR signal is used, starting at approximately 0 Volts (V) and ending at approximately 1.0 V, although different voltage transitions, e.g., positive-going or impulse functions, and different voltage levels are implemented in different embodiments.

A number of corrections are preferably performed on the composite data array. First, any d.c. offset is removed. This is achieved by determining the voltage just before edge, Va, and adjusting term_cal_wave so that Va is set to 0 V. Further, a voltage height of the step, Vb, is determined by finding the ultimate voltage to which the post-edge samples settle.

Figure 7A:
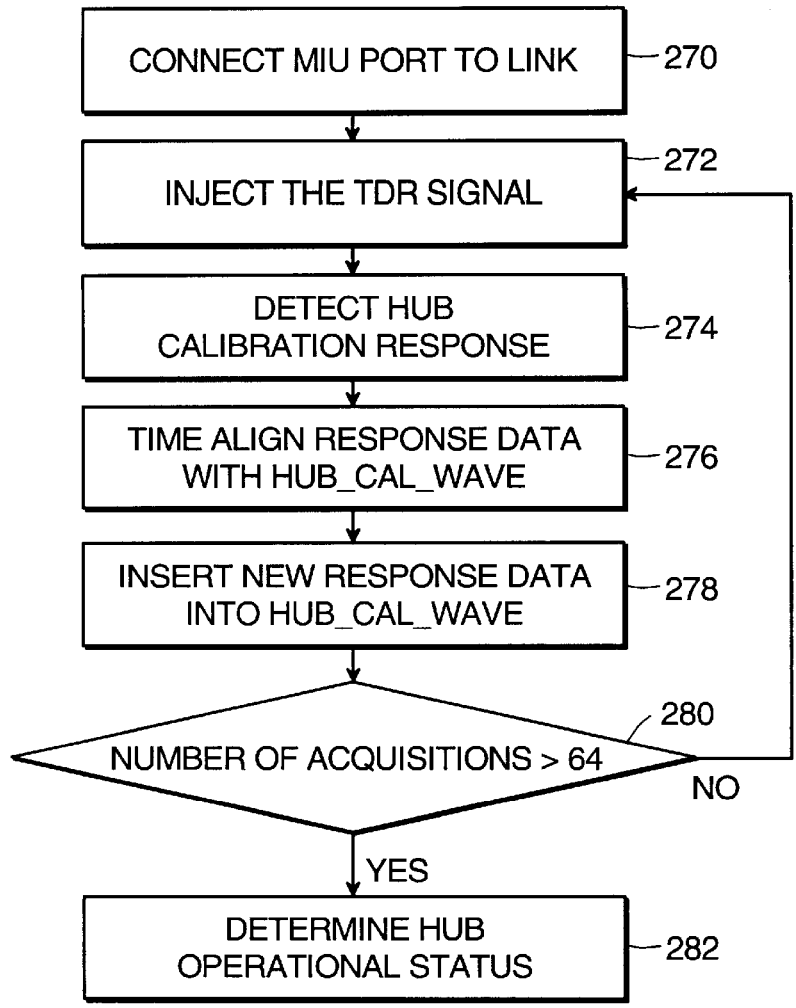
FIG. 7A is a process diagram illustrating the detection of the hub response by the inventive system according to the present invention.

FIG. 7A is a process diagram illustrating the steps involved in determining the hub's time domain response in step 212 of FIG. 2. Specifically, in step 270, the node-side of the link is replaced with the predetermined load or calibration resistor. The hub-side of the network is then configured as the link would be in normal network operation.

Next, in step 272, the TDR signal is injected onto the link 110. The digitizer 126 detects the resulting hub calibration response in step 274. This acquisition is time-aligned with respect to previous acquisitions in a data array hub_cal_wave in step 276 and inserted into the data array hub_cal_wave in step 278.

As indicated by step 280, a composite hub calibration response is developed in the array hub_cal_wave. As discussed previously relative to FIG. 5, the generation of a composite response from multiple, preferably greater than five or ten acquisitions, substantially increases accuracy and small feature identification, for example. In the current embodiment, the actual number of acquisitions performed is 64 or 250 to maximize accuracy.

Figure 7B:
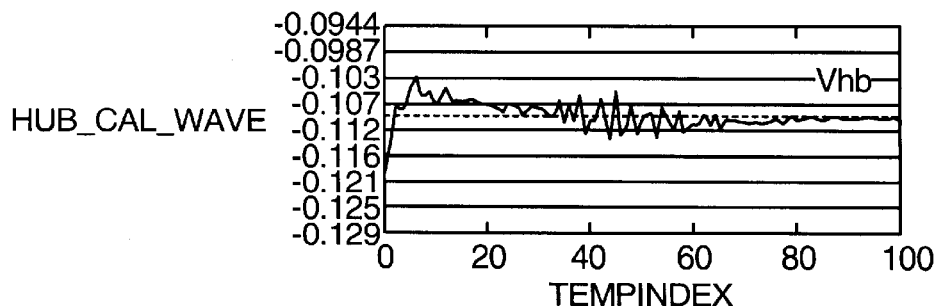
FIG. 7B is a plot of the hub response as a function of time.

FIG. 7B shows an exemplary composite hub response, hub_cal_wave, which has been corrected for the d.c. offset found in the port calibration.

Next in step 282, the controller performs hub operation analysis. For example, whether or not the hub is operational, i.e., on or off, is typically reflected in whether the hub response is inductive, or not. If the magnitude of Vhb slowly decreases over time, i.e., inductive, the hub is probably not operational. Additionally, the level of distortion generated by the hub is characterized.

FIG. 8A shows the process for determining the cumulative time-domain response of the network link 110 of step 214 in FIG. 5.

In the acquisition steps 290–295, a composite time-domain response of the link is created in array cab_hub_wave.

Although data from a single TDR signal injection and detected response can be used, in the preferred embodiment, a composite time domain response is generated by combining the results of multiple sampling events into data array, cab_hub_wave. As indicated before, the combination of multiple sampling events into a single array for analysis has a number of benefits concerning accuracy and small feature detection. First, signal-to-noise ratio is increased dramatically. The accuracy to which resistance is calculated increases dramatically beyond the eight-bit analog-to-digital converter used in the digitizer 126 in the current embodiment. Secondly, temporal accuracy is also increased. The multiple acquisitions are time aligned with respect to each other in cab_hub_wave array to greater than the time delay between successive samples in any given acquisition. In the current embodiment, the digitizer samples at 1 ns intervals, accumulating 1 Gigasamples in each acquisition. The acquisitions are aligned with an accuracy greater than 1 ns, preferably to less than 100 ps by gross alignment relative to the trigger point coupled with finer alignment using pattern matching. This allows small feature location to accuracies of a few centimeters and the avoidance of blindspots negate analysis of regions of the network cabling near the point of TDR signal injection.

In more detail, the MIU port is connected to the link in step 290. This connection can be made at the patch panel, as illustrated in FIGS. 1 and 2, at an end of link in configuration common to network installers as illustrated in FIG. 3, or for network cable testing as in FIG. 4.

In subsequent step 291, the predetermined, or TDR, signal is injected into the cables and the response detected in step 292. The current acquisition is time-aligned with respect the data array cab_hub_wave and thus data from any previous acquisitions in step 293.

As discussed previously, time-alignment is achieved using a combination of hardware and software-based techniques. Gross alignment is achieved with reference to the digitizer's triggering, which started the acquisition. Sub-sampling interval accuracy is achieved by software pattern matching techniques that compare features in the data of the current acquisition to features in the composite response. Then, in step 294, the sample data from the new acquisition is inserted into cab_hub_wave array.

The number of acquisitions that are used to generate the composite response determines the gain in accuracy and SNR. In the preferred embodiment, greater than 5 acquisitions are used, usually more than 10. In fact, in two current embodiments, 64 and 256 separate acquisitions are used. When the selected number of acquisitions have been performed, the acquisition process terminates in step 295.

FIG. 8B shows an exemplary composite response of the network link, cab_hub_wave, compared with the composite hub response, hub_cal_wave, and the calibration response, term_cal_wave. Commonly, when the link response is taken from a configured network, the response of the link is largely determined by the hub response at the lower time delays, or just after the TDR signal injection. This characteristic is evident by comparing the plotted cab_hub_wave and hub_cal_wave data. At higher time delays, however, the response of the terminator becomes evident in the increasing deviation between the data of the two arrays.

Figure 9A:
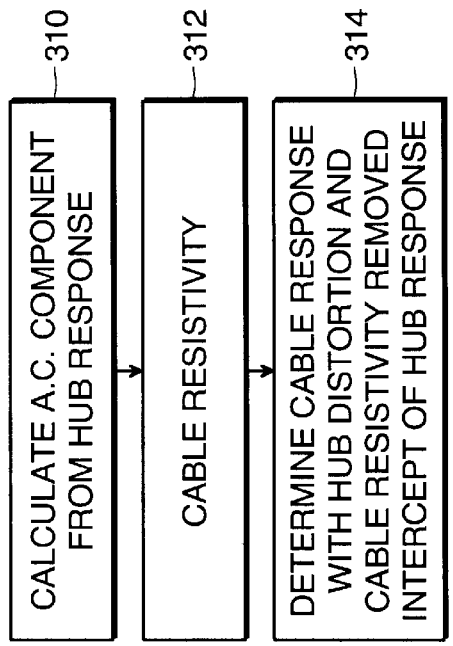
FIG. 9A is a process diagram illustrating the signal processing steps associated with the removal of the hub response from the link response according to the present invention.

FIG. 9A shows the method steps associated with the backing-out of the response of the hub in step 216 of FIG. 5. A simple sample-wise subtraction of the link response from the hub response is not possible because of the inherent d.c. resistivity of the cabling which in included in the cab_hub_wave array.

The first step to removing hub effects to enable analysis of the node-side of the link to the calculate the a.c. component of the hub response using the data in hub_cal_wave in step 310. In the current embodiment, the a.c. component of the hub response is calculated by beginning with the hub_cal_wave and making corrections for real resistance effects in the data using exponential correction. This produces a new array AC, which is a.c. distortion in the hub_cal_wave data Next in step 312, the resistivity of the link cabling is calculated enable subsequent gain correction. This is perform by reference to the slope of the data in the cab_hub_ array. One method for finding this slope is to use the data from the larger time delays, where the distortion effects of the hub are largely non-existent, and extrapolate a y-axis, or voltage-axis, intercept.

Finally, in step 314, a new data array is calculated, T_cable, which represents the cable response with the hub's a.c. distortion removed and corrected for the link's resistivity. Specifically, for each array location (i), the AC component for the corresponding location is subtracted and the cable losses at the location or added, as indicated below:

$$T\_cable_i = cab\_hub\_wave_i - AC_i + (\text{cable resistance losses at } i)$$

Figure 9B:
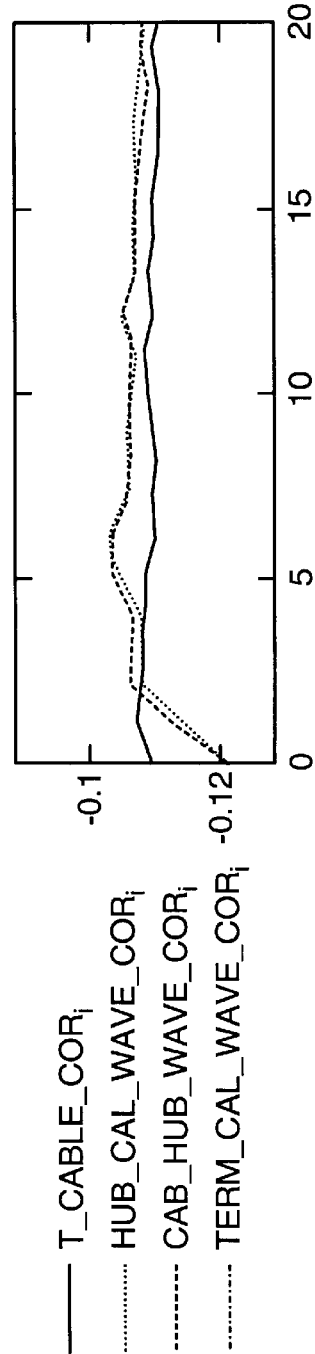
FIG. 9B is a plot of cable's response with hub distortion and cable resistivity removed.

FIG. 9B compares the hub calibration response, the cable response, and the corrected cable responses. As shown, even at the lower time indexes or low time delays, there is little correlation between the T_cable and hub_cal_wave, indicating the removal of the hub distortion.

FIG. 10 shows the steps associated with locating the terminator or end of the cable from step 218 in FIG. 5. Generally, in the preferred embodiment, a number of search techniques are used in combination with a polling algorithm to locate the end or termination of the link.

The first of the two search techniques, termed DeltaZ, is directed to finding open or short circuited terminations in the link. Large or discontinuous changes in the cable impedance are characteristic of this class of terminations. As a result, in the preferred embodiment, a series of exponentially decaying thresholds are used to identify regions impedance change in the corrected cable response. These thresholds are based upon the cumulative resistance of the cable as a function of cable length. Essentially, voltage transitions occurring at higher time delays are weighted more heavily or given more significance than voltage transitions at near time delays due to the fact that the voltage transitions have been reduced in magnitude by both the transmission of the TDR signal to the initial impedance discontinuity and then the propagation of the reflection signal back to the point of injection. FIG. 10B shows the series of positive and negative thresholds (+thres, −thres) relative to the corrected cable response T_cable The second approach to detecting the terminator, termed Gradient, is used or sensitized to detect matched-terminators as typically found in operational networks where the terminator on the bus cable or in the network interface card (NIC) is matched to the characteristic impedance of the cable. In such situations, the response of the gain-compensated response of the network will commonly appear as a change in slope in the corrected cable response.

As illustrated in FIG. 10B, the corrected response changes from having almost no slope to having a positive slope (see point A). This results from the TDR function hitting the matched terminator at the end of the cable and is due to the skin-effects and the end of the accumulated resistance that occurs when the TDR signal reaches the terminator and the inductance effects are slowly diminished. This change in slope is identified by reference to the first derivative of the corrected response.

Figure 10A:
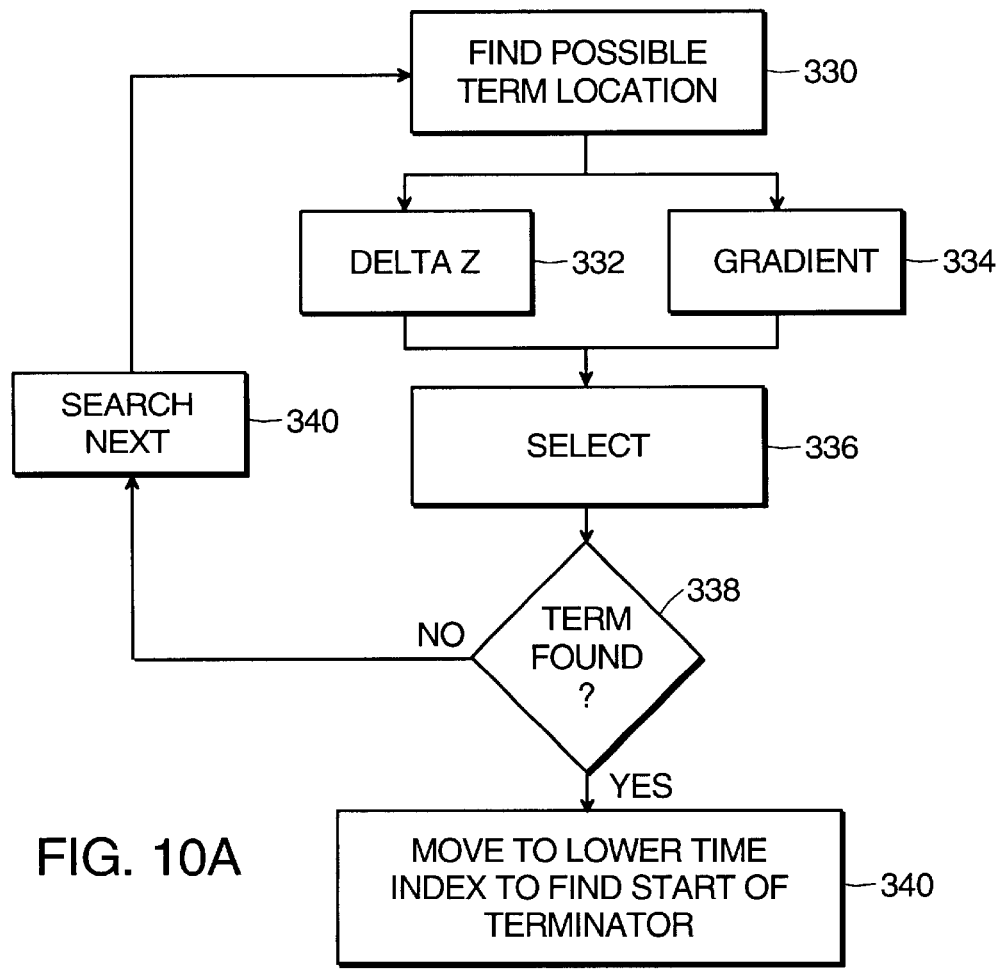
FIG. 10A is a process diagram showing the polling technique used to locate the cable link termination.
Figure 10B:
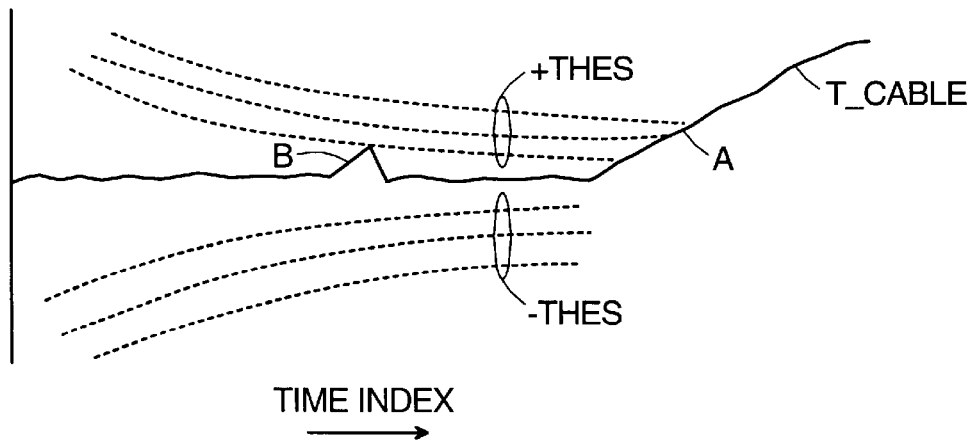
FIG. 10B is a plot of a link response to illustration the operation of the polling technique.

FIG. 10A shows the implementation of the search the techniques in a polling algorithm. In step 330, the process searches into higher time indexes for instances of large discontinuities in impedance or changes in slope. When such instance are found, the DeltaZ algorithm 332 and gradient algorithm 334 are applied to the location. For example, data surround location B in FIG. 10B crosses one of the thresholds (+thres) in the DeltaZ search.

In step 336, a selection is made between among the two search techniques, to determine the one that is most strongly indicating the discovery of the terminator. In the example of the DeltaZ algorithm processing the data at point B, the selection chooses the DeltaZ, since there are no gradient changes at that point.

In step 338, an assessment is made of how strongly the selected search technique indicates a termination. In the example, the data at point B only exceeds the lower of the thresholds, a weak indication. In this case, the termination is declared not found and the process continues to search into the higher time indexes for the next possible termination in steps 340 and 330.

In the second iteration through the search algorithms, the gradient algorithm with find the change in slope associated with data A. This will cause the selection of the gradient algorithm in step 336. And since the illustrated gradient is strongly indicative of a matched terminator, the branching step 338 declares the cable termination found.

Finally, in step 340, after the terminator has been found, the precise location of the start of the terminator is sought. This process involves moving in the direction of decreasing time indexes to find the inflection point in the case of a matched terminator or the beginning of the impedance discontinuity, in the case of an open or short-circuited termination of the link.

Now that the end of the cable is located, the length and skew between pairs using a one-ended cable analysis technique as described in connection with FIGS. 2, 3, and 4 is determined.

Figure 11:
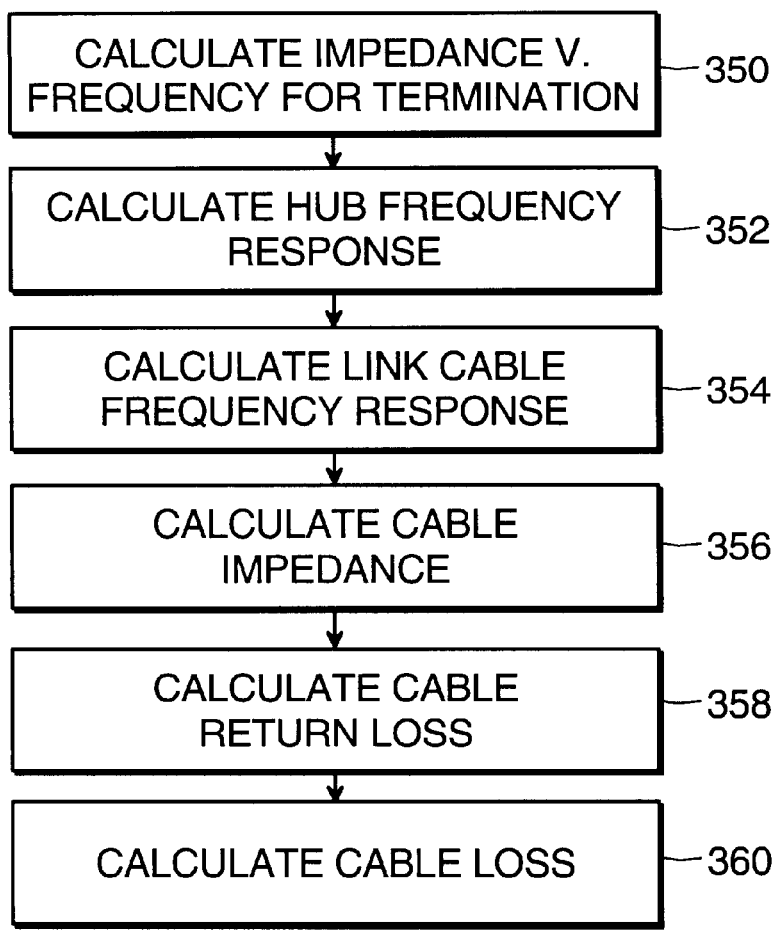
FIG. 11 is a process diagram showing the calculation of link parameters.

FIG. 11 shows the steps involved in calculating relevant link performance parameters.

The impedance as a function of frequency is calculated for the termination in step 350. Reflections occurs at integer multiples of the link cable length, with the initial reflection from the terminator resulting from the initial TDR signal traveling to the terminator and the reflection traveling back to the point of injection. Two way correction is required to determine the magnitude of the terminator impedance, due to the exponential decay caused by the cable's resistivity for the initial pulse and the returning reflection. With this correction, the use of a fast Fourier transform yields the terminator frequency response.

The calculation of the hub and cable frequency response in steps 352 and 354 are based on fast Fourier transforms of port calibration data, term_cal_wave, the hub calibration data, hub_cal_wave, the data from the link response, cab_hub_wave. $S_0$ is set equal to the transform of the term_cal_wave data array; $S_1$ is set equal to the transform of hub_cal_wave; and $S_2$ is set equal to the transform of the cab_hub_wave array. However, in the calculation of $S_2$ data at time indexes greater than the terminator are not used.

With the initial Fourier transforms completed, the calculation of the hub frequency response in step 352 is $S_1/S_0$. The calculation of the cable frequency response in step 354 is $S_2/S_1$.

The calculation of cable impedance in step 356 is based on two formulae $$rho=(Vb-Vc)/(Va-Vb)$$

$$Z=(1-rho)^2/(1-rho)*100\Omega$$

Va and Vb are based on the term_cal_wave data as described previously. Vc is the instantaneous voltage from cab_hub_wave array with the hub distortion removed.

Cable loss in step 360 is determined by integrating the difference or deviation between the impedance of the cable relative to the nominal resistance of a cable, 100Ω.

The cross-talk between the 4 twisted-pairs of wires in the typical UTP wiring is determined by stimulating one wire in each pair combination with a Welsh Hadamard function and measuring the response on the other wire. With 4 pairs number 1, 2, 3, 4. The pair combinations are 1–2, 1–3, 1–4, 2–3, 2–4, and 3–4.

Further, skew in the transmission delay between conductor pairs of a given cable are measured. Also, cross-talk versus time and frequency between signal pairs, impedance versus time and frequency, attenuation versus frequency, and resistance versus frequency are also calculated in the preferred embodiment.

While this invention has been particularly shown and described with references to preferred embodiments thereof, it will be understood by those skilled in the art that various changes in form and details may be made therein without departing from the spirit and scope of the invention.

What is claimed is:

1. A method for computer network physical layer analysis comprising:
   detecting transmissions on a computer network link including instantaneous voltage levels on a computer network media of the link;
   accumulating multiple detected transmissions into a composite response of the computer network link;
   correcting the composite response of the computer network link, wherein the correcting includes removing a d.c. offset; and
   analyzing the computer network link in response to the composite response.

2. A method as claimed in claim 1, wherein the step of accumulating multiple transmissions comprises accumulating multiple transmissions of the same predetermined signal into the composite response prior to the step of analyzing the computer network link using the composite response.

3. A method as claimed in claim 1, further comprising measuring separately a response of a network communications device maintaining the network communications link independently of the network media of the link.

4. A method as claimed in claim 3, further comprising:
   calculating a frequency response of the network communications media in response to the composite response and the response of the network communications device.

5. A method as claimed in claim 1, further comprising calculating a resistance of the computer network media from the composite response.

6. A method as claimed in claim 1, further comprising calculating impedance as a function of frequency for the network communications media using the composite response.

7. A method as claimed in claim 6, further comprising correcting the calculated impedance based on a two-way accumulated resistivity of the network transmission media.

8. A method as claimed in claim 1, further comprising calculating media impedance in response to the composite response and distortion derived from a response of the network communications device.

9. A method as claimed in claim 1, wherein the correcting includes removing the contribution of a network communications device maintaining the network communications link to generate a corrected composite response of the network communications link.

10. A method as claimed in claim 9, wherein the correcting includes compensating for resistivity of the network transmission media.

11. A method as claimed in claim 1, wherein the correcting includes time-alignment using a combination of hardware and software techniques, the software techniques including pattern matching that compares features of current detected transmissions with previous detected transmissions.

12. A method as claimed in claim 1, further comprising characterizing a termination of the computer network link based on the corrected composite response.

13. A method as claimed in claim 12, wherein an impedance discontinuity in the corrected composite response indicates one of an open circuit termination and a short circuit termination, while a change in slope of the corrected composite response indicates a matched termination.

14. A method as claimed in claim 12, wherein the step of locating includes traversing the corrected composite response to identify one of a beginning of a slope change and a beginning of an impedance discontinuity.

15. A method as claimed in claim 1, further comprising using an exponentially decaying threshold to identify in the corrected composite response an indication of an impedance change of the computer network link.

16. A method as claimed in claim 1, further comprising detecting a change in slope of the corrected composite response to identify a termination of the computer network link.

17. A method as claimed in claim 1, further comprising locating a termination of the computer network link based on the corrected composite response.

18. A method for computer network physical layer analysis comprising:
   detecting transmissions on a computer network link including instantaneous voltage levels on a computer network media of the link;
   accumulating multiple detected transmissions into a composite response of the computer network link;
   correcting the composite response of the computer network link, wherein the correcting includes removing a d.c. offset;
   analyzing the computer network link in response to the composite response; and
   calculating loss associated with the network media of the link by integrating a difference between an impedance of the network transmission media and a nominal resistance of the network transmission media.

19. A method as claimed in claim 1, further comprising calculating cross-talk between wiring pairs of network communications link by stimulating one wiring pair and measuring a response to the stimulus on another wiring pair of the network communications link.

20. A method for computer network physical layer analysis comprising:
   detecting transmissions on a computer network link including instantaneous voltage levels on a computer network media of the link;
   accumulating multiple detected transmissions into a composite response of the computer network link;
   analyzing the computer network link in response to the composite response; and wherein the wiring pairs are stimulated with a Walsh-Hadamard function.

21. A system for computer network physical layer analysis comprising:
   a digitizer for detecting transmissions on a computer network link including instantaneous voltage levels on a computer network media of the link;
   a controller for accumulating multiple detected transmissions into a composite response of the computer network link, correcting the composite response of the computer network link, wherein the correcting includes removing a d.c. offset, and analyzing the computer network link in response to the composite response.

22. A method for computer network physical layer analysis comprising:
   generating a predetermined signal on a computer network link;
   detecting a response of the computer network link to the predetermined signal;
   analyzing the detected response for indicia of a termination using at least two different criteria, the different criteria including an impedance discontinuity and a slope change in the detected response;
   comparing the analysis for the different criteria to characterize the termination;
   measuring a response of a network communications device maintaining the network communications link; and
   removing the response of the network communications device from the detected response of the link analyzing the detected response of indicia of the termination.

23. A method for physical layer analysis of a computer network link having a network communications device connected to network transmission media, comprising:
   detecting transmissions on the computer network link including instantaneous voltage levels on the network transmission media of the link;
   accumulating multiple detected transmissions into a composite response of the computer network link;
   correcting the composite response of the computer network link including
      determining independently a device response of the network communications device and removing the device response from the composite response of the computer network link; and
   analyzing the computer network link in response to the composite response.

24. A method as claimed in claim 23, wherein the correcting includes removing any d.c. offset.

25. A method as claimed in claim 23, wherein the network communications device comprises one of a hub and a switch.

26. A method as claimed in claim 23, wherein the step of removing the device response from the composite response of the link includes removing an a.c. distortion component of the device response.

27. A method as claimed in claim 23, wherein the step of correcting the composite response includes compensating for resistivity losses of the network transmission media.

28. A method as claimed in claim 27, wherein the step of compensating for losses includes determining the resistivity losses of the network transmission media by extrapolation based on the composite response.

* * * * *